Patented Nov. 5, 1946

2,410,740

UNITED STATES PATENT OFFICE 2,410,740

PREPARATION OF LACTATES

John Leslie Jones, Toledo, Ohio, assignor to Libbey-Owens-Ford Glass Company, Toledo, Ohio, a corporation of Ohio No Drawing. Application April 1, 1944
Serial No. 529,215

5 Claims. (Cl. 260—484)

The invention relates to a method of preparing the esters of lactic acid with allyl, crotyl, alpha-methyl allyl, methallyl, beta-chloro allyl, beta-methyl crotyl, ethyl, propyl, isopropyl, primary butyl, secondary butyl and isobutyl alcohols.

Because lactic acid is a hydroxy acid, molecules of lactic acid may react with one another to form esters and polyesters. Heretofore in the preparation of a simple ester of lactic acid, the reaction of molecules of the lactic acid with one another has caused serious losses so that the yield of the simple ester has been relatively low.

The principal object of the invention is to provide a method of preparing simple esters of lactic acid in increased yields so as to render the production of such esters economically feasible. Such esters are used as intermediates in the preparation of synethetic resins and other materials. More specific objects and advantages are apparent from the description which merely illustrates and discloses the invention and is not intended to impose limitations upon the claims.

Heretofore a simple ester of lactic acid has been prepared by the conventional method of preparing esters, which consists in reacting the acid with the alcohol in the presence of an acid catalyst while distilling off the water formed by the reaction. Usually some of the alcohol distills off with the water, but a sufficient concentration of alcohol for the reaction may be maintained by adding some of the alcohol from time to time. After the evolution of water has ceased, unreacted alcohol may be distilled off and the ester that has been formed may also be obtained by distillation.

At the end of such an esterification reaction there remains a considerable residue which cannot be further esterified with the alcohol. Heretofore it has been considered necessary to discard such residue, and the discarding of such residue involves the loss of a considerable proportion of the lactic acid employed.

The present invention is based upon the discovery that a substantial additional quantity of the ester can be recovered by reacting such residue with the alcohol in the presence of an alkoxide of a metal as a catalyst. An alkoxide can exist only under anhydrous conditions, but the residue left at the end of an ordinary esterification reaction between lactic acid and an alcohol is anhydrous because of the removal of water during the reaction. It is believed that such a residue is free from unesterified lactic acid residues, and comprises mainly lactide, the alkyl ester of lactyl lactic acid and the alkyl ester of dilactyl lactic acid. Lactyl lactic acid is the product of the esterification of two lactic acid molecules, and dilactyl lactic acid consists of a chain of three lactic acid residues formed by the esterification of three lactic acid molecules. It is believed that the absence of unesterified lactic acid groups in the residue prevents any esterification reaction from taking place when the residue is reacted with alcohols in the presence of an alkoxide. If any esterification reaction took place, the alkoxide would be destroyed by the water formed in such an esterification reaction.

In the novel reaction that is the subject of the present invention, one of the reactants is the residue remaining after the production of a lactate from alyl, crotyl, alpha-methyl allyl, methallyl, beta-chloro allyl, beta-methyl crotyl, ethyl, propyl, isopropyl, primary butyl, secondary butyl or isobutyl alcohol by esterification with lactic acid. The other reactant is one of said alcohols, which may not be the same alcohol used in the esterification reaction by which the residue was formed. If it is desired to react the residue with an alcohol different from the alcohol used in the reaction by which the residue was formed, the alcohol reacted with the residue should have a boiling point that is not substantially lower than the boiling point of the alcohol used for the original esterification reaction. If the residue is reacted with an alcohol having such a boiling point, a substantial yield of the lactate of such alcohol may be recovered. By the use of an excess of an alcohol having a boiling point not substantially lower than that of the alcohol used for the original esterification reaction, the original alcohol may be displaced from the residue by an ester interchange reaction and distilled off.

In the practice of the invention, it is preferable to use an excess of the alcohol for reaction with the residue to produce a maximum yield of the lactate of such alcohol. At the end of the reaction, the excess of the alcohol can be recovered by distillation before the ester is distilled off.

Any alkoxide of a metal may be used as a catalyst for the reaction. The common alkoxide-forming metals are aluminum, alkali metals such as sodium and potassium, and alkaline earth metals such as calcium and magnesium. These metals are members of groups I, II and III of the periodic system. The nature of the alkyl radical of the alkoxide does not make any difference, because the alkoxide of the alcohol to be reacted with the residue is always formed in the reaction solution. The proportions of different alkoxides used may be varied widely. In each case any appreciable catalytic proportion may be used.

The reaction may be carried out at various temperatures, but it is preferable to autoclave the reactants to produce the maximum yield most rapidly. If the alcohol used for the reaction is different from the alcohol employed for the original esterification reaction in which the residue was formed, distillation to remove the alcohol used for the original reaction, either at atmospheric pressure or under a vacuum, may be begun as soon as the reactants are brought together. If loss of the reactant alcohol takes place, some of the alcohol may be added from time to time to maintain an adequate concentration thereof

*Example*

A commercial aqueous solution of lactic acid may be distilled at atmospheric pressure in a substantially neutral condition to remove water preparatory to esterification of the lactic acid. Preferably the distillation of water is continued until the composition, calculated on the assumption that only simple lactic acid is present, consists of 100 per cent lactic acid. To this product is added from one and one-half to three equivalents of allyl alcohol, and an acid catalyst consisting preferably of a weight of a strong mineral acid such as concentrated sulfuric or phosphoric acid equal to 0.25-1.0 per cent of the weight of lactic acid employed. From 100 to 200 cc. of a water-entraining liquid such as isobutyl ether, n-butyl ether, benzene, toluene or a petroleum solvent may be added for each equivalent of lactic acid to assist in the removal of water. Distillation is then carried out, preferably at atmospheric pressure, allyl alcohol and entraining liquid being added from time to time to maintain an adequate concentration thereof. When evolution of water has ceased, the composition preferably is neutralized by addition of a base such as sodium acetate, calcium carbonate or sodium carbonate, and the excess of allyl alcohol may be distilled off at atmospheric pressure. The allyl lactate may then be distilled off at 5-25 mm. absolute pressure. The maximum yield of allyl lactate that can be obtained by the foregoing procedure is about 75 per cent. To the residue remaining after the distillation of the allyl lactate is added from one-half to five times its weight of dry allyl alcohol and from 0.1 to 2.0 per cent of its weight of metallic sodium or magnesium. A maximum yield of allyl lactate may then be produced by refluxing for about 15 hours. The allyl lactate may then be recovered as in the preceding stage (after neutralizing the composition if desired) by distilling off the excess of allyl alcohol, and then distilling off the allyl lactate under vacuum. By this second reaction the yield of allyl lactate may be increased to 90-95 per cent. In the foregoing example, in place of the metallic sodium or magnesium, an equal weight of aluminum tri-(n-propoxide) may be used. In place of the allyl alcohol there may be employed an equivalent amount of crotyl, alpha-methyl allyl, methallyl, beta-chloro allyl, beta-methyl crotyl, ethyl, propyl, isopropyl, primary butyl, secondary butyl or isobutyl alcohol.

Various embodiments of the invention may be devised to meet various requirements.

Having described my invention, I claim:

1. A method of preparing the esters of lactic acid with allyl, crotyl, alpha-methyl allyl, methallyl, beta-chloro allyl, beta-methyl crotyl, ethyl, propyl, isopropyl, primary butyl, secondary butyl and isobutyl alcohols that comprises reacting one of said alcohols, in the presence of an alkoxide of a metal as a catalyst, with the anhydrous distillation residue remaining after the production of a lactate from one of said alcohols by esterification with lactic acid.

2. A method of preparing the esters of lactic acid with allyl, crotyl, alpha-methyl allyl, methallyl, beta-chloro allyl, beta-methyl crotyl, ethyl, propyl, isopropyl, primary butyl, secondary butyl and isobutyl alcohols that comprises reacting an excess of one of said alcohols, in the absence of water and in the presence of an alkoxide of a metal as a catalyst, with the anhydrous distillation residue remaining after the production of a lactate from one of said alcohols by esterification with lactic acid.

3. A method of preparing the esters of lactic acid with allyl, crotyl, alpha-methyl allyl, methallyl, beta-chloro allyl, beta-methyl crotyl, ethyl, propy, isopropyl, primary butyl, secondary butyl and isobutyl alcohols that comprises reacting one of said alcohols, in the presence of an alkoxide of a metal as a catalyst, with the anhydrous distillation residue remaining after the production of a lactate by carrying to completion the esterification reaction of lactic acid with an excess of one of said alcohols.

4. A method of preparing the esters of lactic acid with allyl, crotyl, alpha-methyl allyl, methallyl, beta-chloro allyl, beta-methyl, crotyl, ethyl, propyl, isopropyl, primary butyl, secondary butyl and isobutyl alcohols that comprises reacting an excess of one of said alcohols, in the absence of water and in the presence of an alkoxide of a metal as a catalyst, with the anhydrous distillation residue remaining after the production of a lactate by carrying to completion the esterification reaction of lactic acid with an excess of one of said alcohols.

5. A method of preparing allyl lactate that comprises reacting lactic acid with allyl alcohol in the presence of an acid catalyst and distilling to produce an anhydrous residue free from unesterified lactic acid residues, and reacting said anhydrous residue with allyl alcohol in the presence of an alkoxide of a metal as a catalyst.

JOHN LESLIE JONES.